United States Patent
Jo et al.

(10) Patent No.: US 7,987,308 B2
(45) Date of Patent: Jul. 26, 2011

(54) MULTI-INTERFACE CONTROLLER, MEMORY CARD HAVING THE MULTI-INTERFACE CONTROLLER, AND INTERFACE SETTING METHOD

(75) Inventors: Nam-Phil Jo, Seoul (KR); Min-Soo Kang, Seongnam-si (KR); Chang-IL Son, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 97 days.

(21) Appl. No.: 11/496,150

(22) Filed: Jul. 31, 2006

(65) Prior Publication Data
US 2007/0055823 A1   Mar. 8, 2007

(30) Foreign Application Priority Data
Aug. 1, 2005   (KR) .................. 10-2005-0070108

(51) Int. Cl.
*H05K 7/10* (2006.01)
*G06F 9/44* (2006.01)
(52) U.S. Cl. ........... 710/301; 710/302; 365/63; 717/168
(58) Field of Classification Search .................. 710/301, 710/302; 365/63; 717/168
See application file for complete search history.

(56) References Cited

U.S. PATENT DOCUMENTS

| | | | | |
|---|---|---|---|---|
| 6,002,605 A * | 12/1999 | Iwasaki et al. | ................. | 365/51 |
| 6,151,647 A | 11/2000 | Sarat | | |
| 6,658,516 B2 * | 12/2003 | Yao | ................. | 710/301 |
| 6,663,007 B1 * | 12/2003 | Sun et al. | ................. | 235/487 |
| 6,741,934 B2 * | 5/2004 | Chen et al. | ................. | 701/213 |
| 6,795,327 B2 * | 9/2004 | Deng et al. | ................. | 365/63 |
| 6,857,038 B2 * | 2/2005 | Liu et al. | ................. | 710/301 |
| 6,899,278 B2 * | 5/2005 | Chen et al. | ................. | 235/492 |
| 7,032,827 B2 * | 4/2006 | Wang et al. | ................. | 235/492 |
| 7,069,369 B2 * | 6/2006 | Chou et al. | ................. | 710/301 |
| 7,237,049 B2 * | 6/2007 | Kang et al. | ................. | 710/104 |
| 7,257,660 B2 * | 8/2007 | Chang et al. | ................. | 710/301 |
| 7,292,946 B2 * | 11/2007 | Huang et al. | ................. | 702/64 |
| 7,296,097 B2 * | 11/2007 | Kanamori et al. | ................. | 710/10 |
| 7,409,477 B2 * | 8/2008 | Wyatt et al. | ................. | 710/62 |
| 7,464,192 B2 * | 12/2008 | Barnett et al. | ................. | 710/11 |
| 7,493,437 B1 * | 2/2009 | Jones et al. | ................. | 710/301 |
| 2001/0000405 A1 * | 4/2001 | Gray et al. | ................. | 235/375 |
| 2002/0116668 A1 * | 8/2002 | Chhor et al. | ................. | 714/42 |
| 2003/0065867 A1 * | 4/2003 | Mowery et al. | ................. | 710/310 |

(Continued)

FOREIGN PATENT DOCUMENTS

FR   2 857 117   1/2005

(Continued)

OTHER PUBLICATIONS

English Abstract for Publication No. WO2004/084127.

(Continued)

*Primary Examiner* — Mark Rinehart
*Assistant Examiner* — Christopher A Daley
(74) *Attorney, Agent, or Firm* — F. Chau & Associates, LLC

(57) ABSTRACT

A multi-interface controller having a first logic circuit and a second logic circuit. The first logic circuit supports a first interface. The second logic circuit supports a second interface. The first logic circuit is enabled based on a first command. The second logic circuit is enabled based on a second command.

14 Claims, 7 Drawing Sheets

U.S. PATENT DOCUMENTS

| | | | |
|---|---|---|---|
| 2003/0172219 A1* | 9/2003 | Yao | 710/305 |
| 2004/0064686 A1* | 4/2004 | Miller et al. | 713/1 |
| 2004/0070952 A1* | 4/2004 | Higuchi et al. | 361/737 |
| 2004/0078700 A1* | 4/2004 | Jeong | 714/42 |
| 2004/0117553 A1 | 6/2004 | Kurakata et al. | 711/115 |
| 2005/0086434 A1* | 4/2005 | Kang et al. | 711/115 |
| 2005/0125584 A1 | 6/2005 | Pinto et al. | |
| 2005/0144385 A1 | 6/2005 | Mowery et al. | |
| 2006/0047860 A1* | 3/2006 | Lin | 710/11 |
| 2006/0047861 A1* | 3/2006 | Hung et al. | 710/11 |
| 2006/0053241 A1* | 3/2006 | Lin et al. | 710/301 |
| 2006/0075395 A1* | 4/2006 | Lee et al. | 717/168 |
| 2006/0085583 A1* | 4/2006 | Yu et al. | 710/301 |
| 2006/0095626 A1* | 5/2006 | Tsay et al. | 710/301 |
| 2006/0151614 A1 | 7/2006 | Nishizawa et al. | |
| 2006/0212640 A1* | 9/2006 | Lee et al. | 710/315 |
| 2006/0248388 A1* | 11/2006 | Kanamori et al. | 714/25 |

FOREIGN PATENT DOCUMENTS

| | | |
|---|---|---|
| JP | 2003-281477 | 10/2003 |
| JP | 2003-317054 | 11/2003 |
| JP | 2004-185273 | 7/2004 |
| KR | 10-2003-0083540 | 10/2003 |
| KR | 10-2004-0048827 | 6/2004 |
| WO | WO2004/084127 | 9/2004 |

OTHER PUBLICATIONS

Search Report issued on Nov. 18, 2010 from French PTO.

* cited by examiner

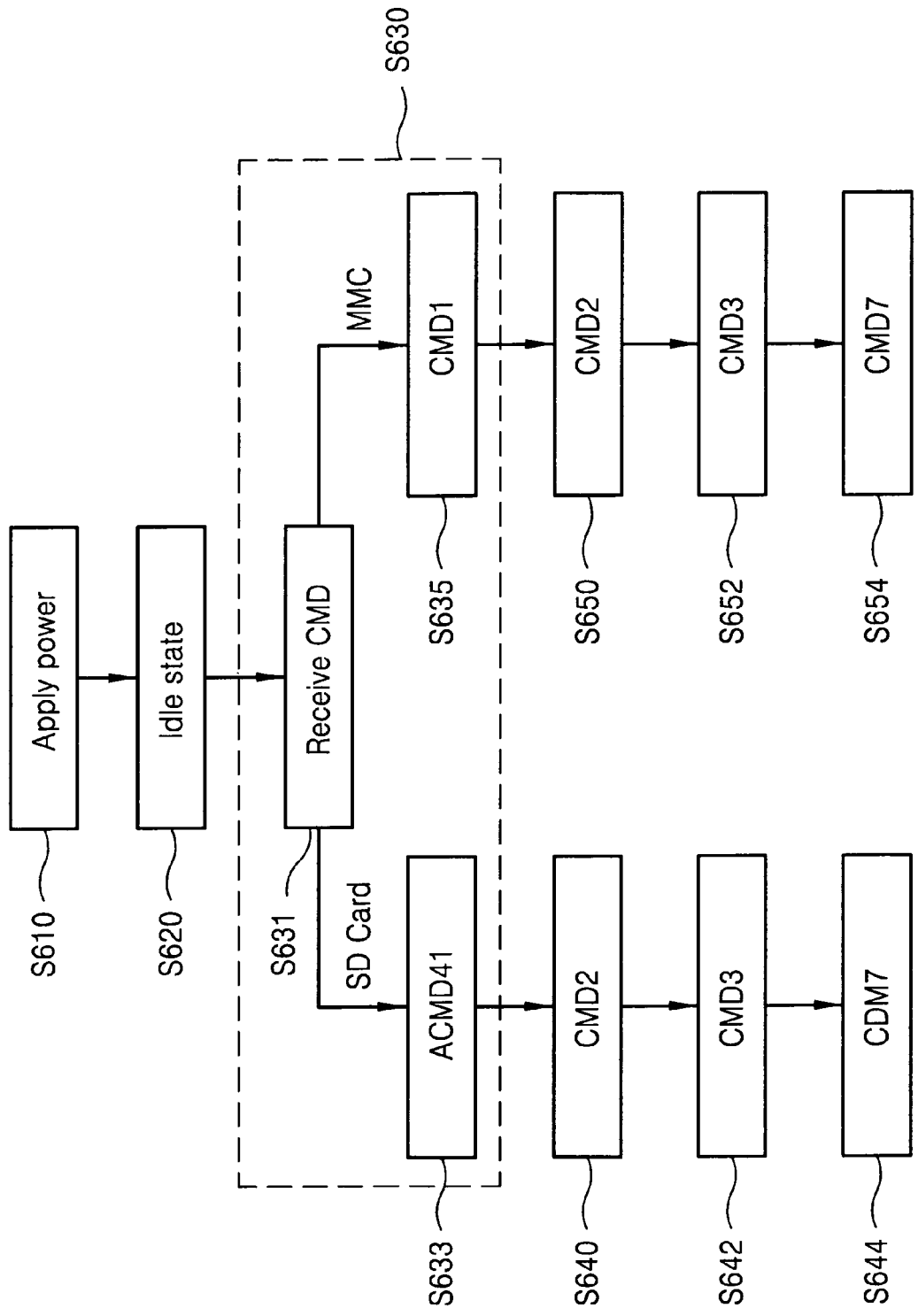

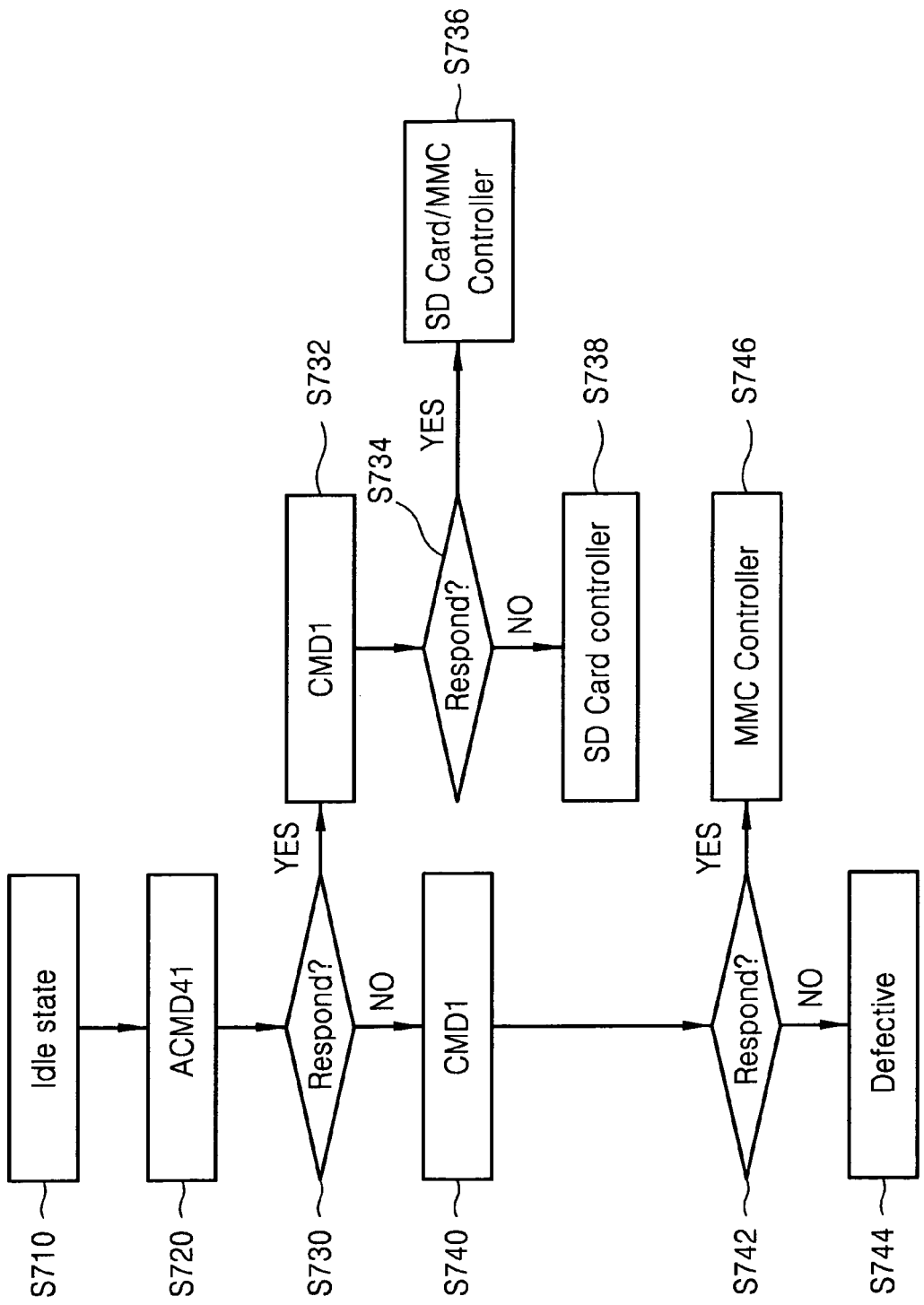

MULTI-INTERFACE CONTROLLER, MEMORY CARD HAVING THE MULTI-INTERFACE CONTROLLER, AND INTERFACE SETTING METHOD

CROSS-REFERENCE TO RELATED PATENT APPLICATIONS

This application claims priority to Korean Patent Application No. 2005-0070108, filed on Aug. 1, 2005, in the Korean Intellectual Property Office, the disclosure of which is incorporated by reference herein.

BACKGROUND OF THE INVENTION

1. Technical Field

The present disclosure relates to a semiconductor device, and more particularly, to a multi-interface controller which supports a plurality of interfaces, and a memory card having the same.

2. Discussion of the Related Art

SD (security digital) cards or MMCs (multimedia cards) are widely used as memory cards for PDAs, smart phones, mobile phones, MP3 players, camcorders, and digital cameras.

FIG. 1 illustrates a conventional controller used as an SD card interface controller in an SMT (surface mount technology) card. FIG. 2 illustrates the conventional controller used as an MMC interface controller in the SMT card. Referring to FIGS. 1 and 2, even when a controller 10 supports both SD and MMC card interfaces, to mount the controller 10 on an SD or MMC card, PCBs (printed circuit boards) of different types are needed or a wire bonding option needs to be changed.

When the controller 10 is used as a controller supporting the SD card interface in the SMT card as shown in FIG. 1, a PCB 13 is used in which a power voltage, for example, 3.3 V, is supplied to a mode pin 11 of the controller 10. In contrast, when the controller 10 is used as a controller supporting the MMC interface in the SMT card as shown in FIG. 2, a PCB 15 is used in which a ground voltage VSS is supplied to the mode pin 11 of the controller 10. Thus, the PCB for mounting the controller 10 has to be adapted to the type of interface for which the controller 10 is to be used. In addition, for a COB (chip on board), when the controller 10 is used as a controller supporting the SD or MMC card interfaces, the wire bonding option has to be adapted for each interface.

Accordingly, there is a need for a multi-interface controller which supports an interface suitable for a host without the need for adaptation of a PCB or a wire bonding option.

SUMMARY OF THE INVENTION

According to an exemplary embodiment of the present invention, a multi-interface controller comprises a first logic circuit supporting a first interface and a second logic circuit supporting a second interface, wherein the first logic circuit is enabled based on a first command and the second logic circuit is enabled based on a second command. Thus, the multi-interface controller can be used as a controller supporting the first interface or a controller supporting the second interface.

According to an exemplary embodiment of the present invention, there is provided a multi-interface controller having an SD card mode and an MMC mode. During the SD card mode, the multi-interface controller operates as an SD card controller. During the MMC mode, the multi-interface controller operates as an MMC controller. The SD card mode is enabled in response to an active SD card MMC mode enable signal. The SD card mode enable signal is activated based on a first command and the MMC mode enable signal is activated based on a second command.

According to exemplary embodiment of the present invention, a multi-interface controller installed on a memory card comprises a detection circuit detecting a command output by an external host to initialize the multi-interface controller in an idle state, a selection signal generation module generating a selection signal in response to an output signal of the detection circuit, and a controller having a plurality of logic circuits supporting interfaces corresponding thereto, wherein, when one of the logic circuits is enabled in response to the selection signal, at least one of the other logic circuits is disabled in response to the selection signal.

According to an exemplary embodiment of the present invention, a method for setting an operation interface in a controller supporting at least two different interfaces comprises the controller in an idle state receiving a command that a host first outputs, to initialize the controller, and the controller setting one of the interfaces selected based on the command to the operation interface.

According to an exemplary embodiment of the present invention, a memory card comprises a memory device having a plurality of memory cells to store data, and a multi-interface controller exchanging data between the memory device and a first host supporting a first interface or a second host supporting a second interface, wherein, when the memory card is in an idle state, the multi-interface controller is set to a controller supporting the first interface based on a first command output by the first host and a controller supporting the second interface based on a second command output by the second host.

According to an exemplary embodiment of the present invention, a memory card comprises a non-volatile memory device storing data, a detection circuit receiving and detecting a first command output from a first host supporting a first interface or a second command output from a second host supporting a second interface when the memory card is in an idle state, an enable signal generation module generating an enable signal based on an output signal of the detection circuit, a first logic circuit supporting the first interface, and a second logic circuit supporting the second interface, wherein the first logic circuit is enabled in response to the enable signal generated in response to the first command and exchanges predetermined data between the first host and the non-volatile memory, and the second logic circuit is enabled in response to the enable signal generated in response to the second command and exchanges predetermined data between the second host and the non-volatile memory.

According to an exemplary embodiment of the present invention, a memory card comprises a memory device storing data and a controller exchanging predetermined data between a host and the memory device, wherein the controller comprises an SD card logic circuit supporting an SD card interface and an MMC logic circuit supporting an MMC interface, and the SD card logic circuit is enabled in response to a first command and the MMC logic circuit is enabled in response to a second command.

According to an exemplary embodiment of the present invention, a method for setting an interface comprises receiving a command output from a host to initialize an IC card in an idle state after power is applied, the IC card comprising a memory device storing data and a multi-interface controller having a plurality of logic circuits, each supporting a different interface, and inserted in a host, enabling one of the logic circuits based on the command and disabling the other logic circuits, and controlling an exchange of data between the memory device and the host using an interface that the enabled logic circuit supports.

According to an exemplary embodiment of the present invention, a method for setting an interface comprises a multi-interface controller supporting each of a plurality of interfaces receiving a command output from a host supporting one of the interfaces to initialize the multi-interface controller in an idle state, and setting one of the interfaces to be supported by the multi-interface controller based on the command.

According to an exemplary embodiment of the present invention, a method for testing a multi-interface controller capable of supporting a plurality of interfaces comprises the multi-interface controller receiving a first command requesting a first voltage profile of the multi-interface controller and a second command requesting a second voltage profile of the multi-interface controller, and testing the multi-interface controller based on one of a first response based on the first command and a second response based on the second command.

BRIEF DESCRIPTION OF THE DRAWINGS

The above and other features of the present invention will become more apparent by describing in detail exemplary embodiments thereof with reference to the attached drawings in which:

FIG. 6 is a flow chart that explains the operation of a multi-interface controller according to an exemplary embodiment of the present invention; and FIG. 7 is a flow chart of a method for testing a multi-interface controller according to an exemplary embodiment of the present invention.

DETAILED DESCRIPTION OF EXEMPLARY EMBODIMENTS

Figure 1:
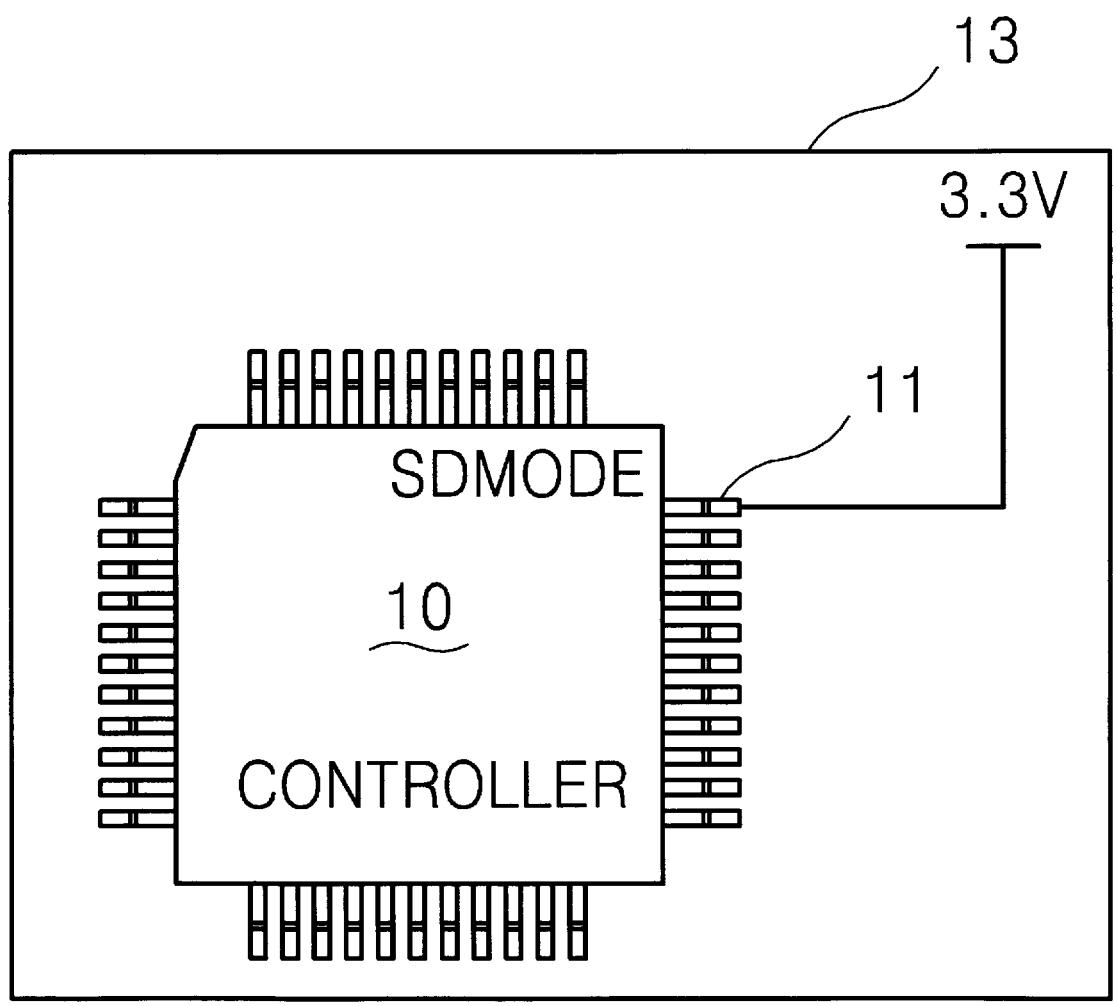
FIG. 1 illustrates a conventional controller used as an SD card interface controller in an SMT (surface mount technology) card.
Figure 2:
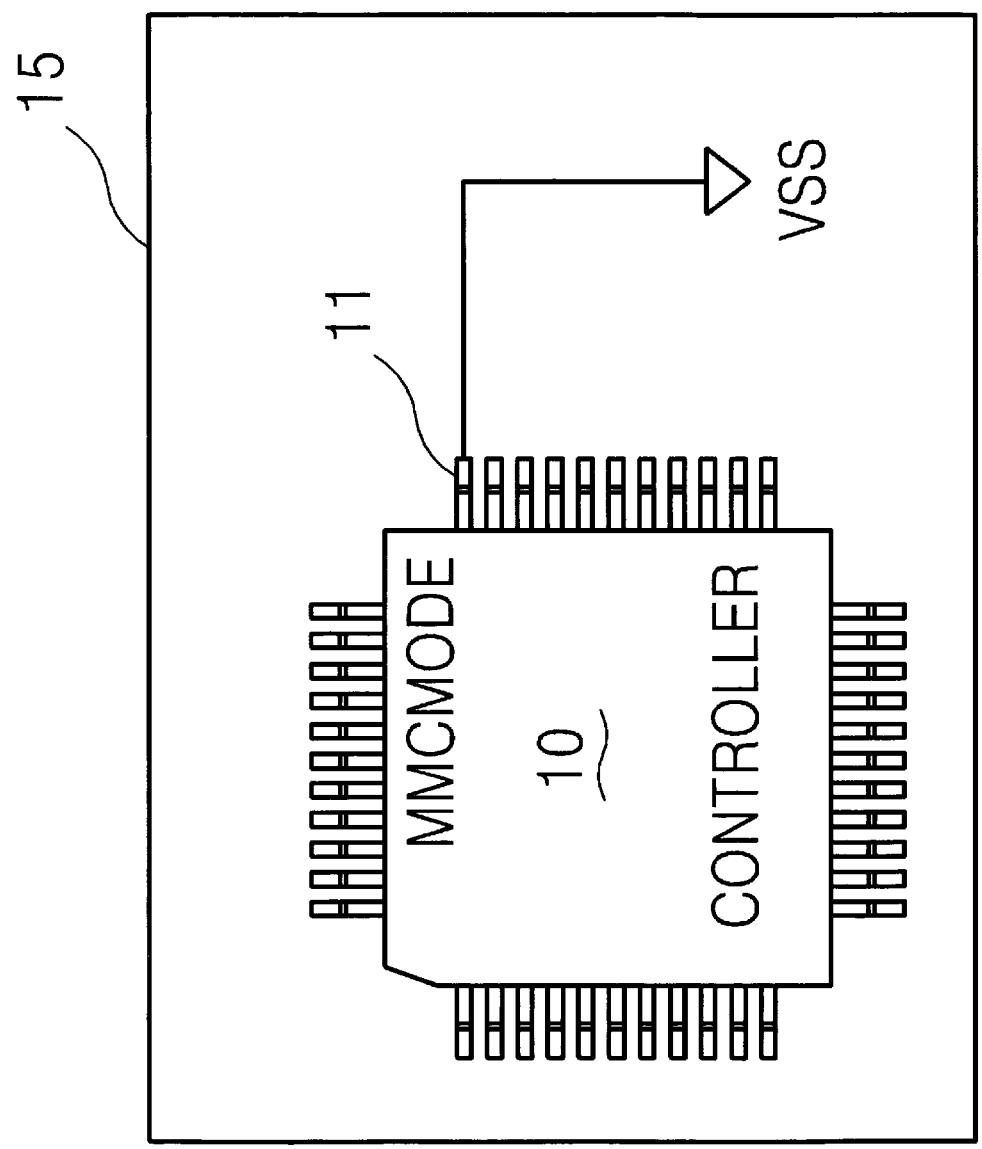
FIG. 2 illustrates the conventional controller used as an MMC interface controller in the SMT card.

Hereinafter, exemplary embodiments of the present invention will be described in detail with reference to the attached drawings. Like reference numerals in the drawings denote like elements.

Figure 3:
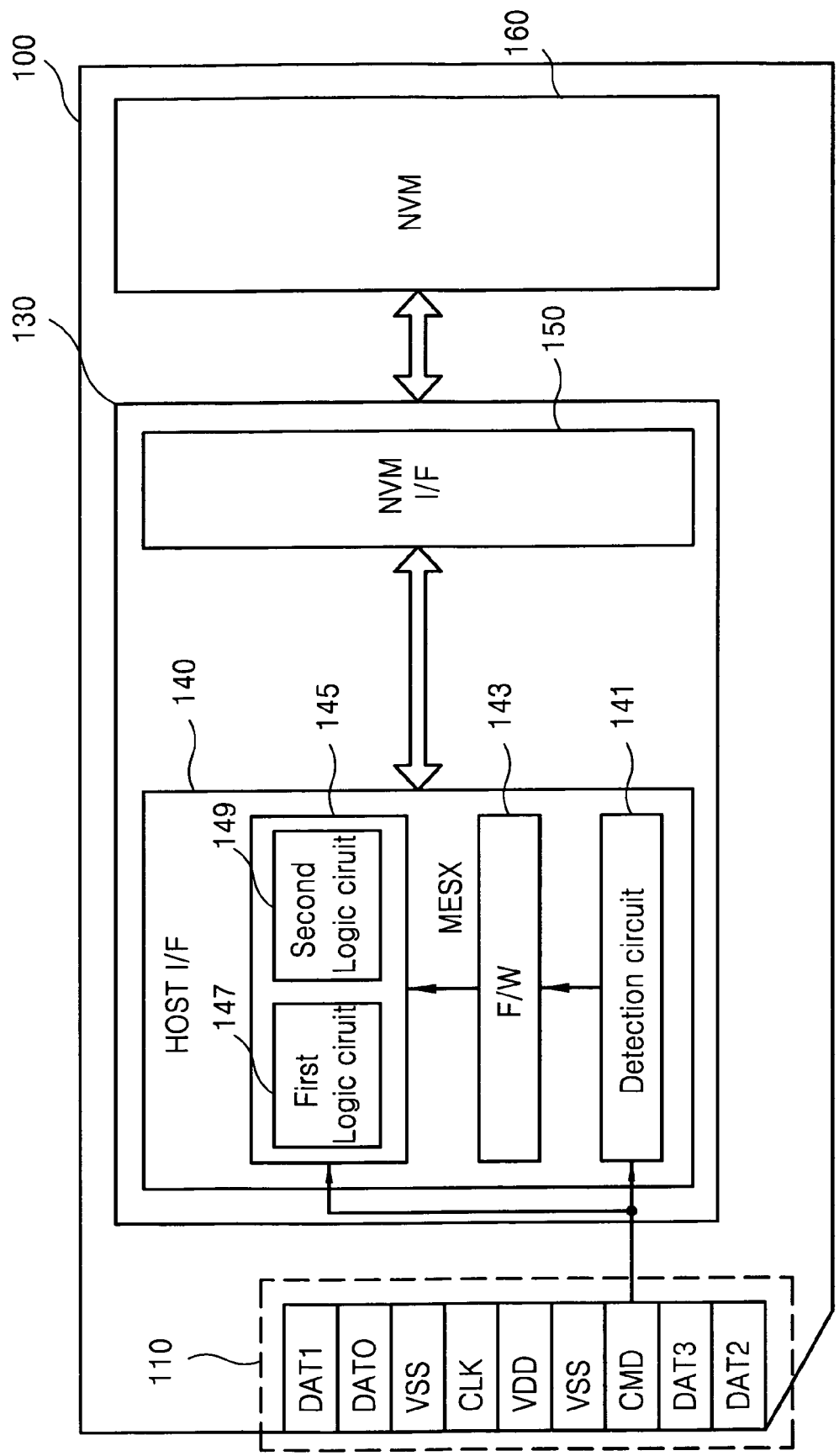
FIG. 3 illustrates a memory card having a multi-interface controller according to an exemplary embodiment of the present invention.

FIG. 3 illustrates a memory card having a multi-interface controller according to an exemplary embodiment of the present invention. Referring to FIG. 3, a memory card 100 includes a multi-interface controller 130 and a memory device 160. The memory card 100 may be embodied as an IC card, an SD card or an MMC.

The multi-interface controller 130 is capable of supporting a plurality of different interfaces and controlling the automatic selection of one of the interfaces based on a first command output from a host (not shown). The first command initializes the multi-interface controller 130 in an idle state to exchange data between the host and the memory device 160. The exchange of data and/or commands between the host and the memory device 160 is based on the selected interface.

The multi-interface controller 130 includes a host interface 140 and a memory interface 150. The host interface 140 interfaces data and/or commands exchanged between the host and the multi-interface controller 130. The host interface 140 includes a detection circuit 141, a firmware (or mode enable signal generation module) 143, and a controller 145.

When the memory card 100 is inserted into a corresponding host, power is applied to the memory card 100, and the memory card 100 is in an idle state in response to an idle state entry command CMD0. For example, after the command CMD0 is output from the host, the detection circuit 141 detects a command output from the host, for example, a command requesting a voltage profile of the memory card 100, to initialize the memory card 100 in the idle state. The detection circuit 141 may be embodied by a register such as an SFR (special function register).

The firmware 143 reads a command stored in the register 141 and generates a mode enable signal MESX, where X is 1 or 2. Thus, the firmware 143 functions as a mode enable signal generation module. The mode enable signal generation module may be embodied in hardware (H/W) and/or software (S/W).

The controller 145 includes at least two logic circuits supporting different interfaces. Although FIG. 3 illustrates that the controller 145 includes a first logic circuit 147 supporting a first interface and a second logic circuit 149 supporting a second interface, the number of the logic circuits is not limited thereto. The first and second logic circuits 147 and 149 may be embodied by H/W and/or S/W.

The memory interface 150 interfaces data and/or commands exchanged between the multi-interface controller 130 and the memory device 160. In addition, the memory interface 150 interfaces data and/or commands exchanged within the host interface 140.

The memory device 160 is a memory cell array used to store predetermined data and can be embodied by non-volatile memories such as an EEPROM, a NAND flash memory, and a NOR flash memory, or volatile memories such as a DRAM.

Figure 4:
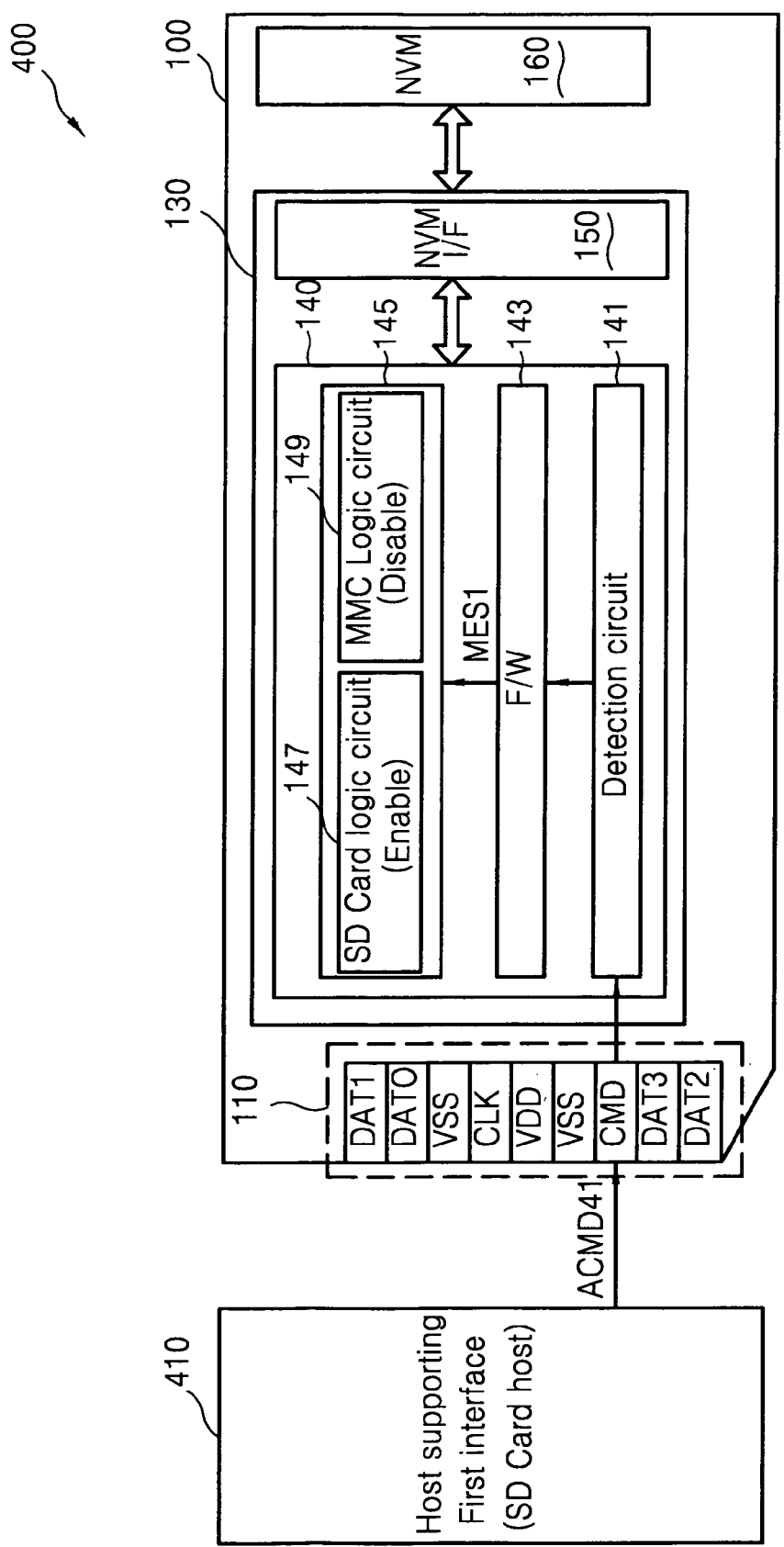
FIG. 4 illustrates a system including a host supporting the first interface and the memory card of FIG. 3.

FIG. 4 illustrates a system including a host supporting the first interface and the memory card of FIG. 3. FIG. 6 is a flow chart that explains the operation of a multi-interface controller according to an exemplary embodiment of the present invention. Referring to FIGS. 3, 4, and 6, a system 400 includes an SD card host 410 supporting an SD card interface, and the memory card 100.

It is assumed that the first logic circuit 147 is an SD card logic circuit supporting an SD card interface and the second logic circuit 149 is an MMC logic circuit supporting an MMC interface. Thus, when the SD card logic circuit 147 is enabled, the controller 145 is operated as a controller supporting the SD card interface, and when the MMC logic circuit 149 is enabled, the controller 145 is operated as a controller supporting the MMC interface.

When the memory card 100 is inserted in the SD card host 410, and power is supplied to the memory card 100 via a pin of the connection pins 110 (S610), the memory card 100 enters an idle state in response to the idle state entry command, for example, CMD0, output from the SD card host 410 (S620). When the memory card 100 is in the idle state, to initialize the memory card 100 in the idle state, the SD card host 410 transmits a command, for example, ACMD41, requesting a voltage profile of the memory card 100 to the multi-interface controller 130 of the memory card 100 via a command pin CMD (S631). The multi-interface controller 130 in response to the ACMD41 transmits the voltage profile stored in an operation condition register (OCR, not shown) to the SD card host 410.

The detection circuit 141 receives and stores the ACMD41. The firmware 143 reads the ACMD41 stored in the detection circuit 141 and outputs an SD card mode enable signal MES1 to the controller 145. The SD card logic circuit 147 is enabled in response to the SD card mode enable signal MES1 while the MMC logic circuit 149 is disabled in response to the SD card mode enable signal MES1. Thus, the multi-interface controller 130 is operated as a SD card controller or a controller supporting the SD card interface (S630 and S633), which is referred to as an SD card mode. The memory card 100 or the multi-interface controller 130 in the idle state performs an initialization step in response to the ACMD41. After the multi-interface controller 130 is set to the SD card controller, the multi-interface controller 130 performs respective steps in response to commands CMD2, CMD3, and CMD7 output from the SD card host 410 (S640, S642, and S644).

Figure 5:
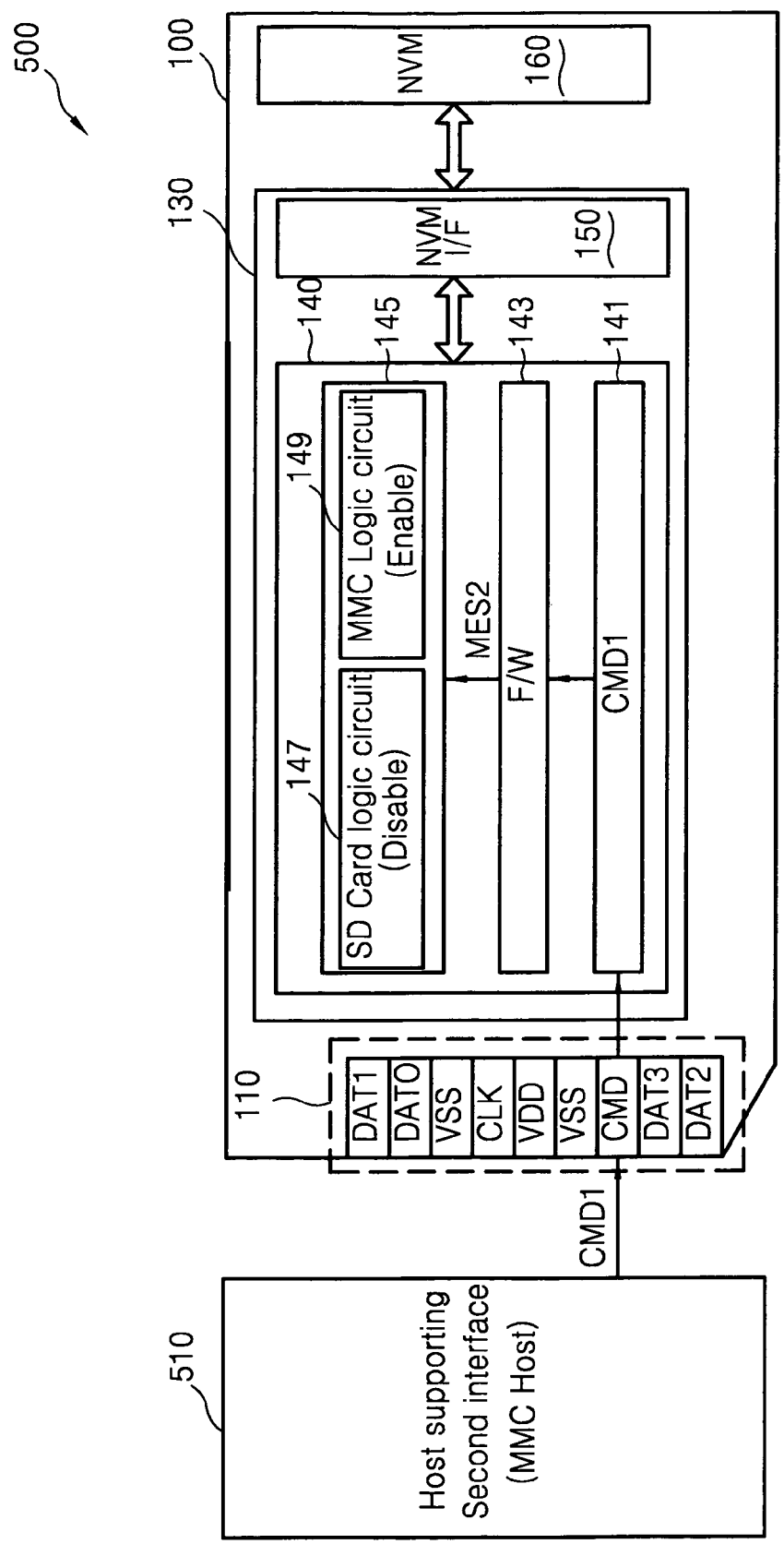
FIG. 5 illustrates a system including a host supporting the second interface and the memory card of FIG. 3.

FIG. 5 illustrates a system including a host supporting the second interface and the memory card of FIG. 3. Referring to FIGS. 3, 5, and 6, a system 500 includes an MMC host 510 supporting an MMC interface, and the memory card 100. It is assumed that the first logic circuit 147 is an SD card logic circuit supporting SD interface and the second logic circuit 149 is an MMC logic circuit supporting an MMC interface.

When the memory card 100 is inserted in the MMC host 510, and the MMC host 510 supplies power to the memory card 100 (S610), the memory card 100 enters an idle state in response to the idle state entry command, for example, CMD0, output from the MMC host 510 (S620). When the memory card 100 is in the idle state, the MMC host 510 transmits a command, for example, CMD1, requesting a voltage profile of the memory card 100 to the multi-interface controller 130 of the memory card 100 (S631).

The multi-interface controller 130 in response to the CMD1, transmits the voltage profile of the memory card 100 stored in the operation condition register (OCR) to the MMC host 510. The detection circuit 141 receives and stores the CMD1 (S635). The firmware 143 reads the CMD1 stored in the detection circuit 141 and outputs an MMC mode enable signal MES2 to the controller 145.

The SD card logic circuit 147 is disabled in response to the MMC mode enable signal MES2 while the MMC logic circuit 149 is enabled in response to the MMC mode enable signal MES2. Thus, the multi-interface controller 130 is operated as an MMC controller or a controller supporting the MMC interface (S630 and S633), which is referred to as an MMC mode.

The memory card 100 or the multi-interface controller 130 in the idle state performs an initialization step in response to the CMD1. After the multi-interface controller 130 is set to the MMC controller, the multi-interface controller 130 performs respective steps in response to commands CMD2, CMD3, and CMD7 output from the MMC host 510 (S650, S652, and S654). The respective commands CMD0, CMD1, CMD2, CMD3, and CMD7 follow an MMC specification officially published by the MMCA (Multimedia Card Association).

FIG. 7 is a flow chart of a method for testing the multi-interface controller according to an exemplary embodiment of the present invention. Referring to FIGS. 3 and 7, card test equipment (not shown) supplies power to the card 100 that is inserted in a slot. Thus, the multi-interface card 100 which supports the first and second interfaces enters an idle state (S710).

The test equipment transmits a first command, for example, ACMD41, to obtain a first voltage profile of the multi-interface card 100 or the controller 130 to the multi-interface card 100 (S720). When the card 100 or the controller 130 transmits a voltage profile thereof to the test equipment in response to the first command (S730), the test equipment transmits the second command, for example, CMD1, to obtain a second voltage profile to the multi-interface card 100 (S732).

When the multi-interface card 100 transmits the second voltage profile thereof to the test equipment in response to the second command (S734), the controller 130 of the multi-interface card 100 is determined to be the controller 130 having all functions of the SD card controller and the MMC controller (S730).

When the multi-interface card 100 does not transmit the second voltage profile thereof to the test equipment in response to the second command (S734), the controller 130 of the multi-interface card 100 is determined to be the controller 130 performing only a function as the SD card controller (S738). Thus, the controller 130 of the multi-interface card 100 can be determined to be a defective controller that does not perform the function of the MMC controller.

However, when the multi-interface card 100 does not respond to the first command (S730), the test equipment transmits the second command, for example, CMD1, to obtain the second voltage profile of the multi-interface card 100 to the multi-interface card 100 (S740). When the multi-interface card 100 transmits the second voltage profile thereof to the test equipment in response to the second command (S742), the controller 130 of the multi-interface card 100 can be determined to be the controller 130 performing only a function as the MMC controller (S746). Thus, the controller 130 of the multi-interface card 100 can be determined to be a defective controller that does not perform the function of the SD card controller.

When the multi-interface card 100 does not respond to both of the first and second commands (S730 and S742), the controller 130 of the multi-interface card 100 can be determined to be a defective controller (S744). Thus, by purchasing the multi-interface controller 130, a memory card manufacturer can manufacture a memory card supporting SD card and MMC interfaces without making adaptations in a PCB or a wire bonding option.

Although in FIG. 7 the card test equipment generates the first command (ACMD41) and then the second command (CMD1), the present invention is not limited thereto. Accordingly, the card test equipment can generate the second command and then the first command. The card test equipment sequentially outputs initialization commands corresponding to the initialization of a card in an idle state that supports SD card and MMC interfaces.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), floating gate transistor, flash memory, CD-ROMs, magnetic tapes, floppy disks, optical data storage devices.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A memory card that is configurable as one of an SD card or an MMC card, the memory card comprising:
   a memory cell array;
   connection pins configured to interface with both an SD card input and an MMC card input, the SD card input of a first host that includes an SD interface and the MMC card input of a second host that includes an MMC interface;
   a special function register configured to receive a command in one of an SD protocol and an MMC protocol from one of the hosts across a pin of the connection pins and store the command therein;
   a detection circuit configured to read the command stored in the special function register, output a first mode enable signal when the command is an ACMD41 command and the memory card is in an idle state, and output a second mode enable signal when the command is a CMD1 command and the memory card is in the idle state; and
   a controller comprising an SD card logic circuit supporting the SD interface and an MMC card logic circuit supporting the MMC interface, wherein the controller enables the SD card logic circuit and disables the MMC card logic circuit in response to receipt of the first mode enable signal, and wherein the controller disables the SD card logic circuit and enables the MMC card logic circuit in response to receipt of the second mode enable signal.

2. The memory card of claim 1, wherein the memory card enters the idle state in response to receipt of a CMD0 command from one of the hosts.

3. A memory card that is configurable as one of an SD card or an MMC card, the memory card comprising:
   a memory cell array; and
   a multi-interface controller having an SD card mode in which the multi-interface controller is operated as an SD card controller and an MMC mode in which the multi-interface controller is operated as an MMC controller,
   wherein the SD card mode is enabled in response to an active SD card mode enable signal and the MMC mode is enabled in response to an active MMC mode enable signal, and the SD card mode enable signal is activated based on a first command and the MMC mode enable signal is activated based on a second command,
   wherein the multi-interface controller further comprises:
   a register storing the first command or the second command; and
   a detection circuit configured to read one of the commands stored in the register, output the active SD card mode enable signal when the read command is an ACMD41 command and the memory card is in an idle state, and output the active MMC mode enable signal when the read command is a CMD1 command and the memory card is in an idle state.

4. The memory card of claim 3, wherein the first command is output from a host supporting an SD card interface to initialize the multi-interface controller in the idle state, and the second command is output from a host supporting an MMC interface to initialize the multi-interface controller in the idle state.

5. The memory card of claim 3, wherein the multi-interface controller comprises:
   an SD card logic circuit supporting an SD card interface in the SD card mode; and
   an MMC logic circuit supporting an MMC interface in the MMC mode, wherein the SD card logic circuit is enabled in response to the SD card mode enable signal activated based on the first command to initialize the multi-interface controller in the idle state, and the MMC logic circuit is enabled in response to the MMC mode enable signal activated based on the second command to initialize the multi-interface controller in the idle state.

6. The memory card of claim 3, wherein the register is a special function register.

7. A memory card that is configurable as one of an SD card or an MMC card, the memory card, comprising:
   a memory cell array; and
   a multi-interface controller comprising:
     a detection circuit detecting a command output by an external host to initialize the multi-interface controller from an idle state; and
     a controller having a plurality of logic circuits supporting a plurality of interfaces, respectively, wherein, when one of the logic circuits is an SD card logic circuit supporting an SD interface, the SD card logic circuit is enabled in response to a first selection signal and disabled in response to a second selection signal, and when at least one of the other logic circuits is an MMC card logic circuit supporting an MMC interface, the MMC card logic circuit is disabled in response to the first selection signal and enabled in response to the second selection signal,
   wherein a command output by the external host to initialize the multi-interface controller in the idle state is ACMD41 or CMD1,
   wherein the multi-interface controller further comprises a special function register receiving and storing one of the ACMD41 and CMD1, and
   wherein the detection circuit is configured to read one of the commands stored in the special function register, output the first selection signal to the controller when the read command is the ACMD41 command and the memory card is in the idle state, and output the second selection signal when the read command is the CMD1 command and the memory card is in the idle state.

8. A memory card that is configurable as one of an SD card or an MMC card, the memory card comprising:
   a memory device having a plurality of memory cells to store data; and
   a multi-interface controller exchanging data between the memory device and one of a first host supporting an SD card interface and a second host supporting an MMC card interface,
   wherein, when the memory card is in an idle state, the multi-interface controller is set to a controller supporting the SD card interface based on a first command output by the first host and a controller supporting the MMC card interface based on a second command output by the second host, and
   wherein the multi-interface controller comprises:
     a special function register receiving and storing one of the first command and the second command;
     an MMC card logic circuit supporting the MMC interface;
     an SD card logic circuit supporting the SD card interface, wherein the SD card logic circuit is enabled based on the first command and the MMC card logic circuit is enabled based on the second command; and
     an enable signal generation module generating an enable signal to enable one of the SD card logic circuit and the MMC card logic circuit in response to one of the first command and the second command stored in the special function register and the memory card being in the idle state.

9. The memory card of claim 8, wherein the first command is ACMD41 and the second command is CMD1.

10. The memory card of claim 8, wherein each of the first and second commands is to obtain a voltage profile of the memory card.

11. A memory card that is configurable as one of an SD card or an MMC card, the memory card comprising:
   a memory device storing data; and
   a controller exchanging predetermined data between a host and the memory device, wherein the controller comprises:
   an SD card logic circuit supporting an SD card interface; and
   an MMC logic circuit supporting an MMC interface, the SD card logic circuit is enabled in response to a first command and the MMC logic circuit is enabled in response to a second command,
   wherein the controller further comprises:
   a special function register receiving and storing one of the first command and the second command; and
   a detection circuit configured to read one of the commands stored in the special function register, output an SD card mode enable signal to enable the SD card logic circuit when the read command is the first command and the memory card is in an idle state, and output an MMC mode enable signal to enable the MMC logic circuit when the read command is the second command and the memory card is in the idle state.

12. The memory card of claim 11, wherein the first command is output by a host supporting the SD card interface to initialize the multi-interface controller in the idle state, and the second command is output from a host supporting the MMC interface to initialize the multi-interface controller in the idle state.

13. A method for testing whether a memory card supports a host having both an SD interface and a host having an MMC interface, the method comprising steps of:
   transmitting by test equipment external to the memory card an ACMD41 command to the memory card to obtain a first voltage profile of the memory card;
   checking by the test equipment for a first response from the memory card based on the transmitted ACMD 41 command;
   transmitting by the test equipment a CMD1 command to the memory card to obtain a second voltage profile of the memory card if the first response is received by the test equipment
   checking by the test equipment for a second response from the memory card based on the transmitted CMD1 command;
   indicating by the test equipment that the memory card supports the host having both the SD interface and the host having the MMC interface if the first and second responses are both received by the test equipment; and
   indicating by the test equipment that the memory card does not support the host having both the SD interface and the host having the MMC interface if the first response or the second response is not received by the test equipment.

14. The method of claim 13, wherein all of the steps are performed after the external test equipment supplies power to the memory card and the supplied power places the memory card into an idle state.

* * * * *